(12) United States Patent
Peralta

(10) Patent No.: US 7,948,108 B2
(45) Date of Patent: May 24, 2011

(54) SYSTEMS AND METHODS FOR CONVERTING MARINE CURRENTS INTO ELECTRICAL ENERGY

(76) Inventor: Ignacio Peralta, Chicago, IL (US)

( * ) Notice: Subject to any disclaimer, the term of this patent is extended or adjusted under 35 U.S.C. 154(b) by 0 days.

(21) Appl. No.: 12/695,711

(22) Filed: Jan. 28, 2010

(65) Prior Publication Data

US 2010/0201131 A1 Aug. 12, 2010

Related U.S. Application Data

(60) Provisional application No. 61/206,843, filed on Feb. 6, 2009.

(51) Int. Cl.
*F04B 35/00* (2006.01)
(52) U.S. Cl. ............................. 290/54; 290/43
(58) Field of Classification Search ............. 290/42, 290/43, 44, 53, 54, 55; 417/333
See application file for complete search history.

(56) References Cited

U.S. PATENT DOCUMENTS

| | | | |
|---|---|---|---|
| 3,922,012 A | 11/1975 | Herz | |
| 4,026,587 A | 5/1977 | Hultman et al. | |
| 4,034,231 A | 7/1977 | Conn et al. | |
| 4,134,710 A | 1/1979 | Atherton | |
| 4,205,943 A | 6/1980 | Vauthier | |
| 4,210,821 A * | 7/1980 | Cockerell | 290/53 |
| 4,306,157 A | 12/1981 | Wracsaricht | |
| 4,335,319 A | 6/1982 | Mettersheimer, Jr. | |
| 4,363,213 A * | 12/1982 | Paleologos | 60/505 |
| 4,383,182 A | 5/1983 | Bowley | |
| 4,464,080 A | 8/1984 | Gorlov | |
| 4,520,273 A | 5/1985 | Rowe | |
| 4,850,190 A | 7/1989 | Pitts | |
| 5,230,215 A | 7/1993 | Nagata | |
| 5,440,176 A | 8/1995 | Haining | |
| 5,491,366 A | 2/1996 | Newman | |
| 5,710,464 A * | 1/1998 | Kao et al. | 290/53 |
| 5,789,826 A | 8/1998 | Kumbatovic | |
| 6,006,518 A | 12/1999 | Geary | |
| 6,109,863 A | 8/2000 | Milliken | |
| 6,531,788 B2 | 3/2003 | Robson | |
| 6,731,018 B1 * | 5/2004 | Grinsted et al. | 290/42 |
| 6,768,217 B2 | 7/2004 | Chalmers et al. | |
| 6,856,036 B2 | 2/2005 | Belinsky | |
| 6,954,006 B2 * | 10/2005 | Williams, Jr. | 290/54 |
| 6,956,299 B2 | 10/2005 | Serrano Molina et al. | |
| 7,042,114 B2 | 5/2006 | Tharp | |
| 7,116,005 B2 * | 10/2006 | Corcoran, III | 290/43 |
| 7,127,886 B2 | 10/2006 | Fielder | |
| 7,279,803 B1 | 10/2007 | Bosley | |

(Continued)

*Primary Examiner* — Nicholas Ponomarenko
(74) *Attorney, Agent, or Firm* — McAndrews, Held & Malloy, Ltd.

(57) ABSTRACT

Systems and methods for converting marine current into electrical energy are provided. Certain systems include a housing with an opening that is adjustable between an open position and a closed position and a plunger that is configurable between a porous state and a non-porous state. The plunger can be configured to translate about the housing in a first direction when the opening is in the open position and the plunger is in the non-porous state, and in the opposite direction when the opening is in the closed position and the plunger is in the porous state. Certain systems include an axis configured to rotate, decks extending radially from the axis, and a vane disposed between the decks. The vane can be configured to translate between a first end of the decks and a second end of the decks when the axis rotates one hundred and eighty degrees.

20 Claims, 14 Drawing Sheets

U.S. PATENT DOCUMENTS

| | | |
|---|---|---|
| 7,291,936 B1 | 11/2007 | Robson |
| 7,331,174 B2 * | 2/2008 | Welch et al. .................. 60/398 |
| 7,482,720 B2 | 1/2009 | Gordon et al. |
| 7,605,490 B2 * | 10/2009 | Srybnik et al. .................. 290/54 |
| 7,737,572 B2 * | 6/2010 | Welch et al. .................. 290/53 |
| 2002/0197148 A1 | 12/2002 | Belinsky |
| 2003/0201645 A1 | 10/2003 | Pacheco |
| 2004/0046396 A1 | 3/2004 | Serrano Molina et al. |
| 2005/0121917 A1 | 6/2005 | Kikuchi |
| 2005/0193728 A1 | 9/2005 | Newman |
| 2005/0285405 A1 | 12/2005 | Tharp |
| 2006/0008351 A1 | 1/2006 | Belinsky |
| 2006/0225416 A1 | 10/2006 | North et al. |
| 2007/0257492 A1 | 11/2007 | Robson |
| 2008/0008587 A1 | 1/2008 | Siegel |
| 2008/0101865 A1 | 5/2008 | Basteck et al. |
| 2008/0106101 A1 | 5/2008 | North et al. |
| 2008/0116692 A1 | 5/2008 | Lagstrom |
| 2008/0309089 A1 | 12/2008 | Lin |
| 2009/0026767 A1 | 1/2009 | Petrounevitch |
| 2009/0140524 A1 | 6/2009 | Kejha |

* cited by examiner

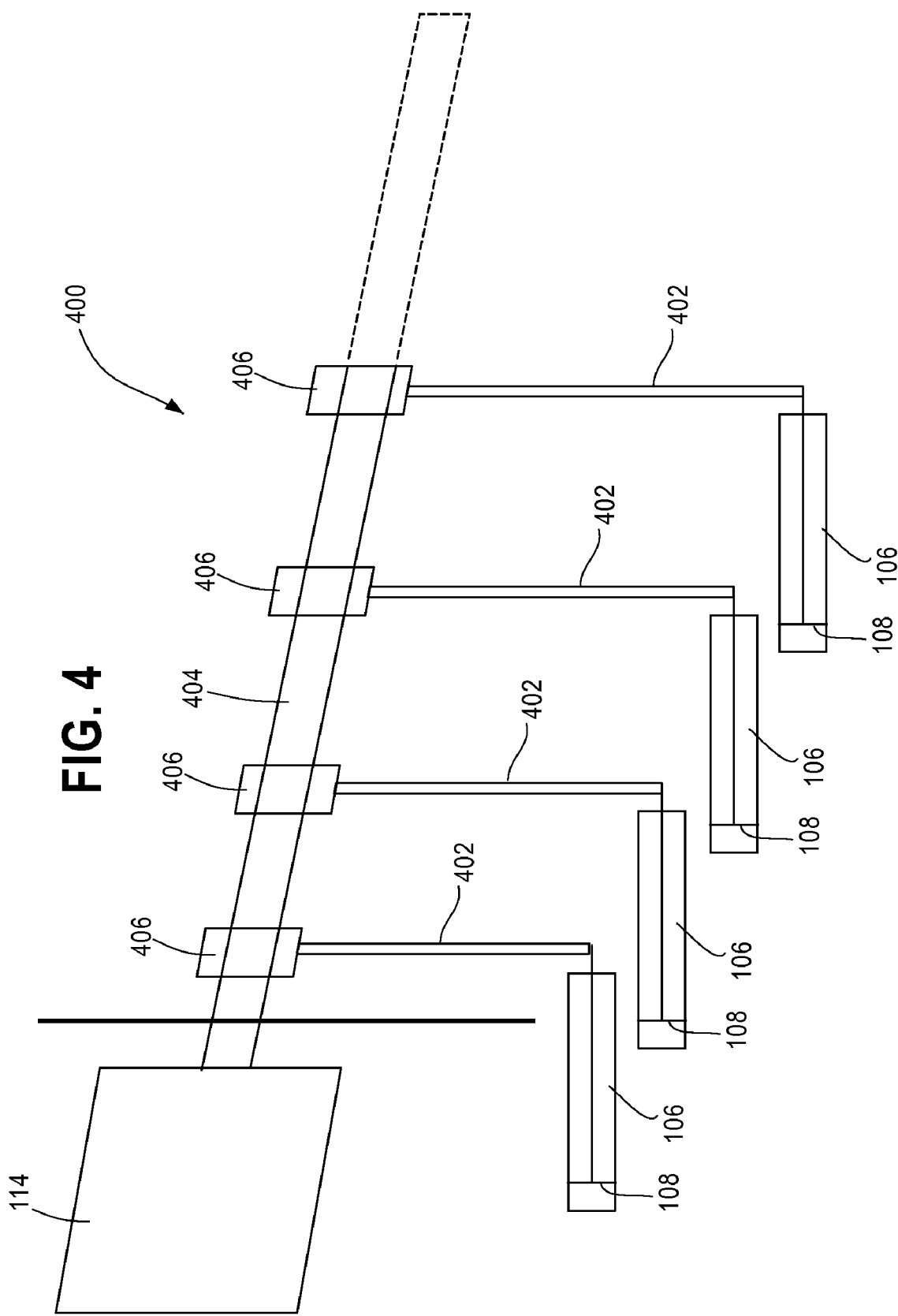

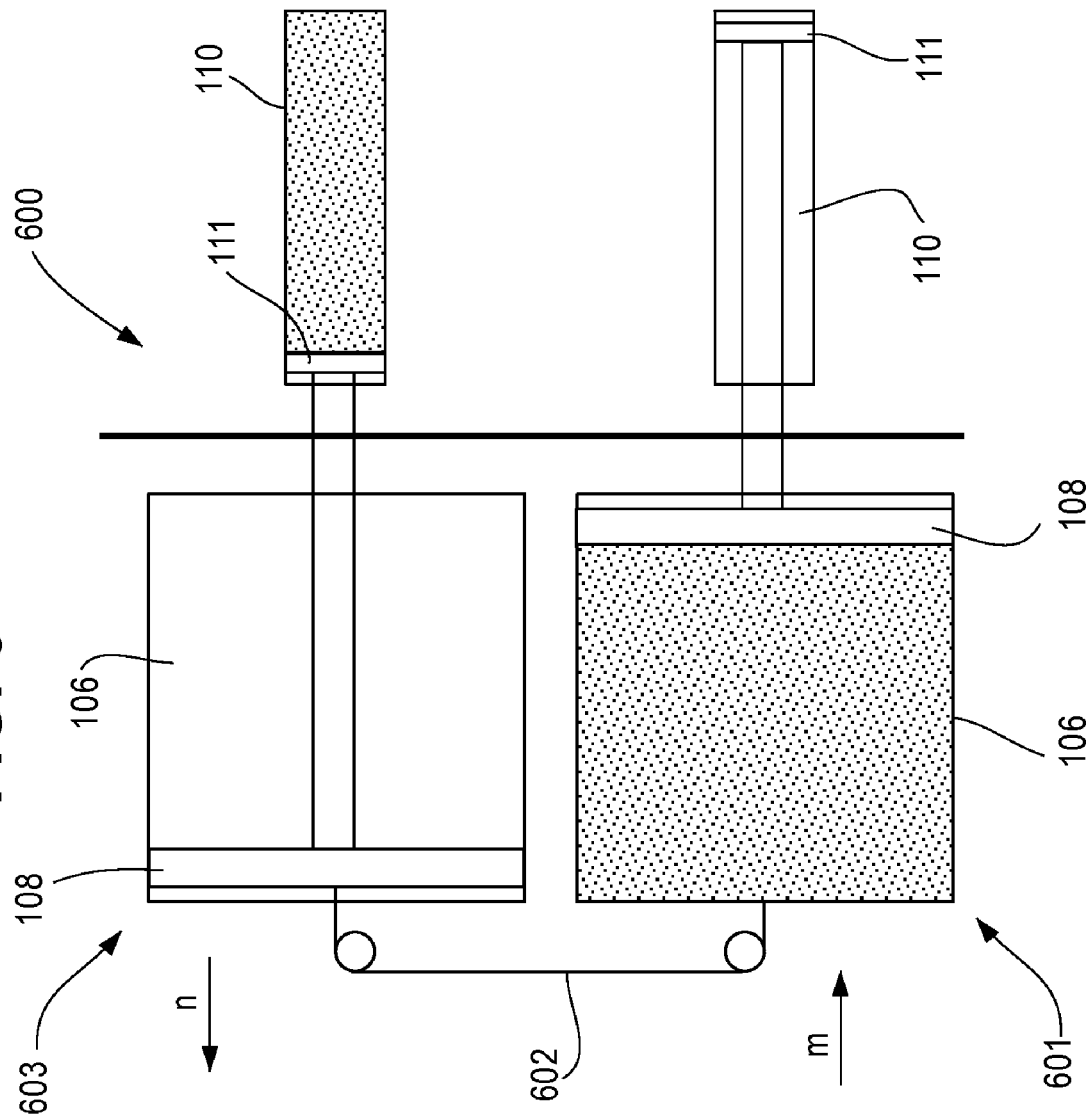

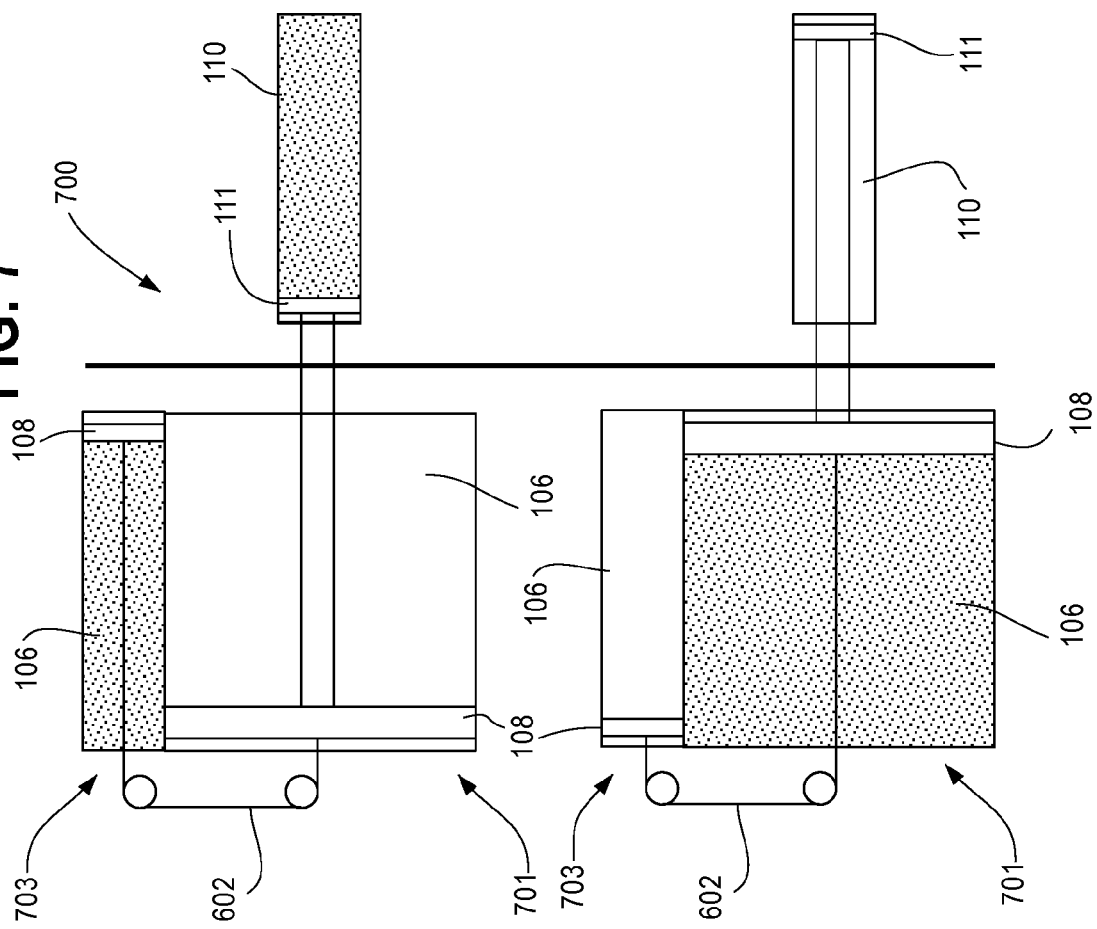

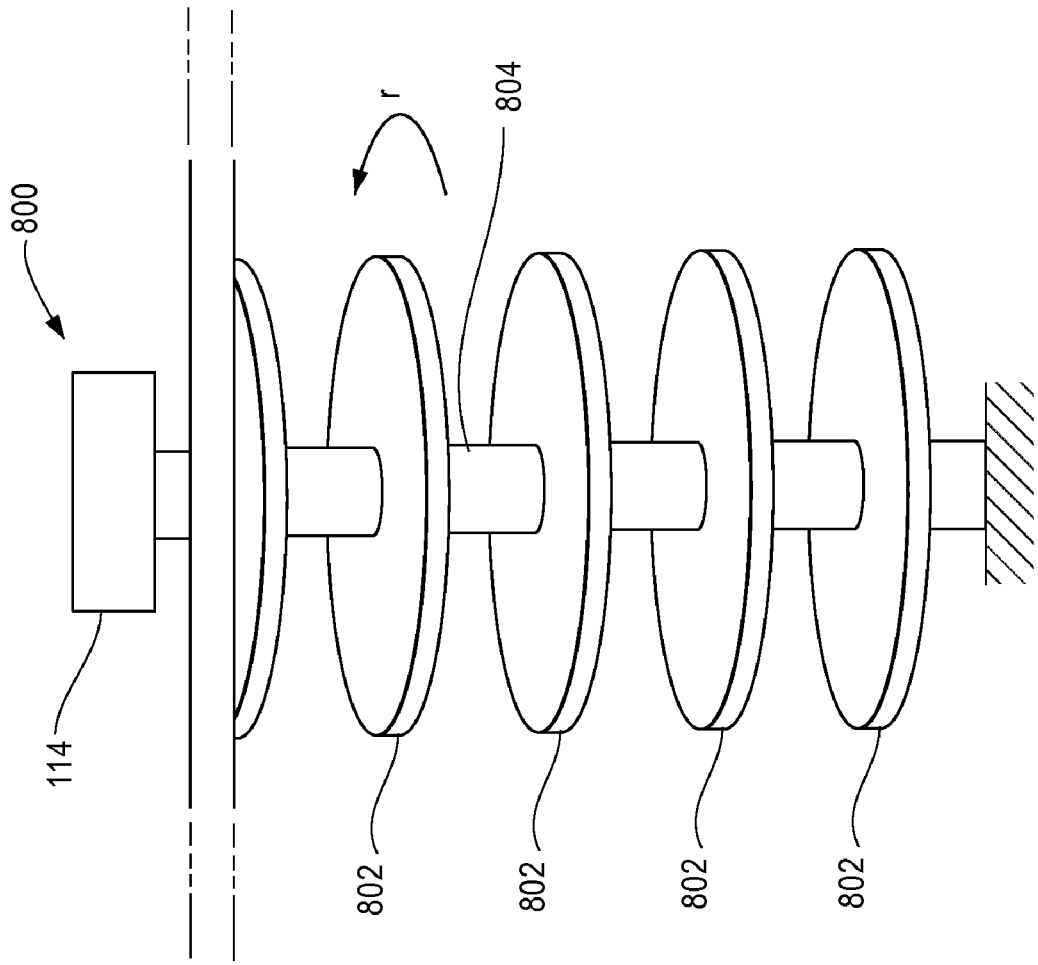

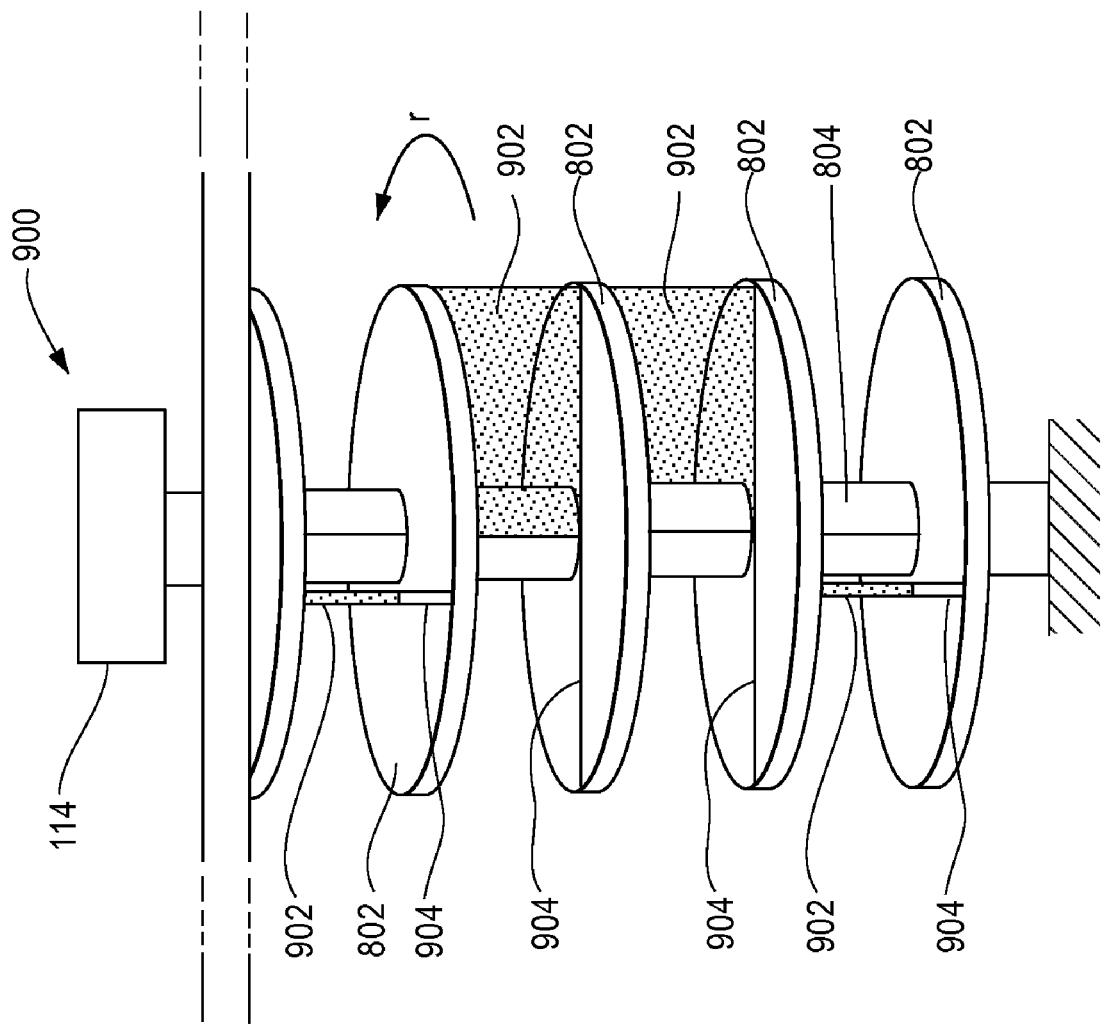

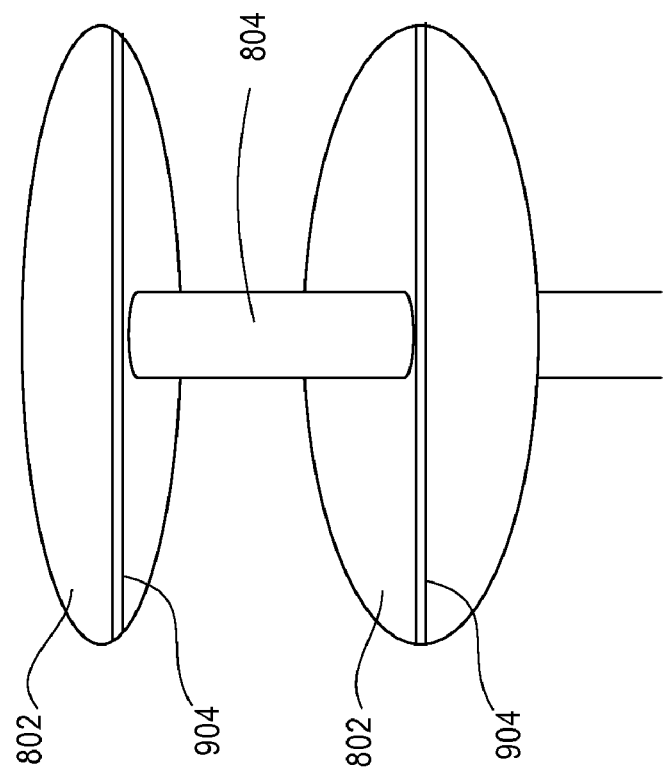
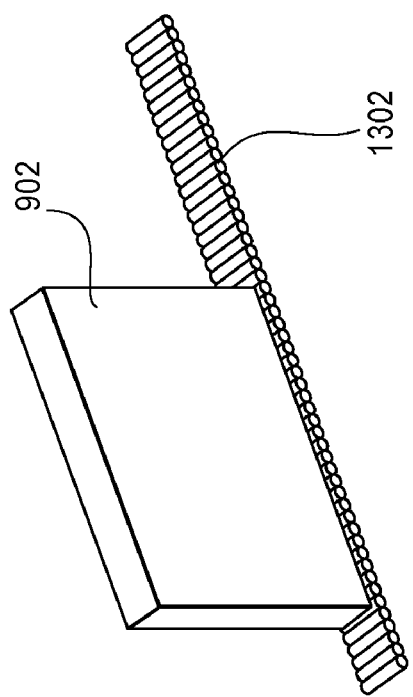

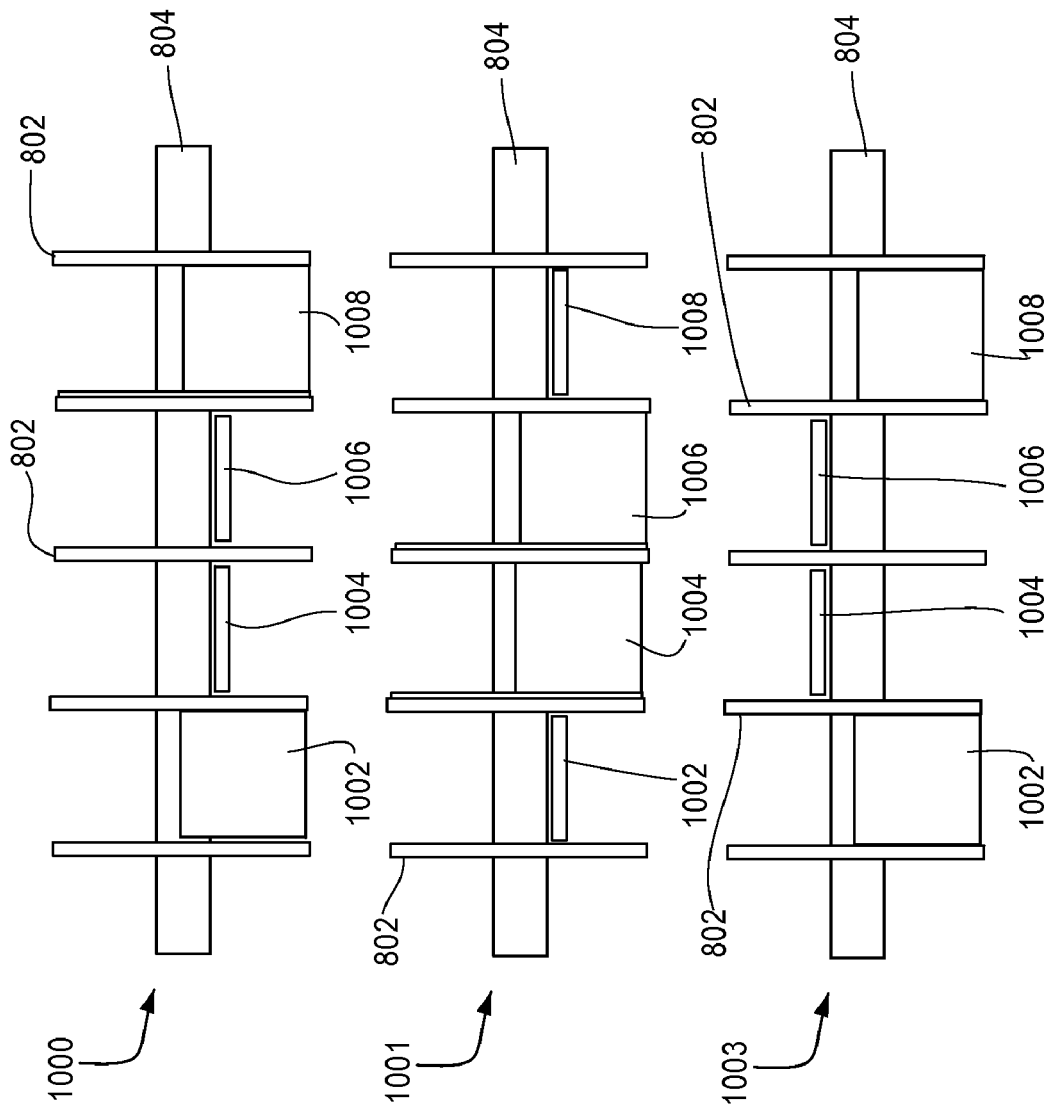

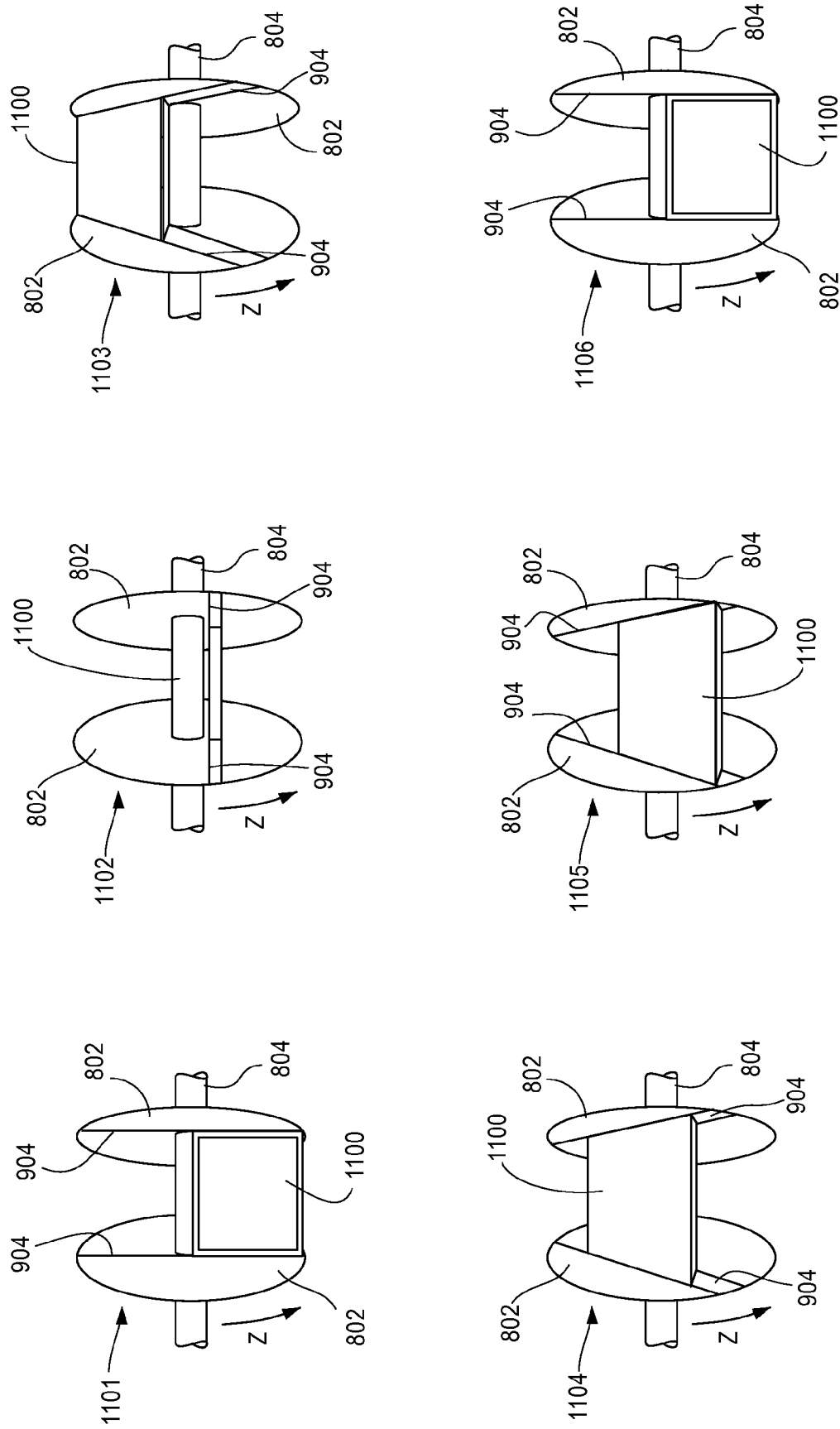

FIG. 12

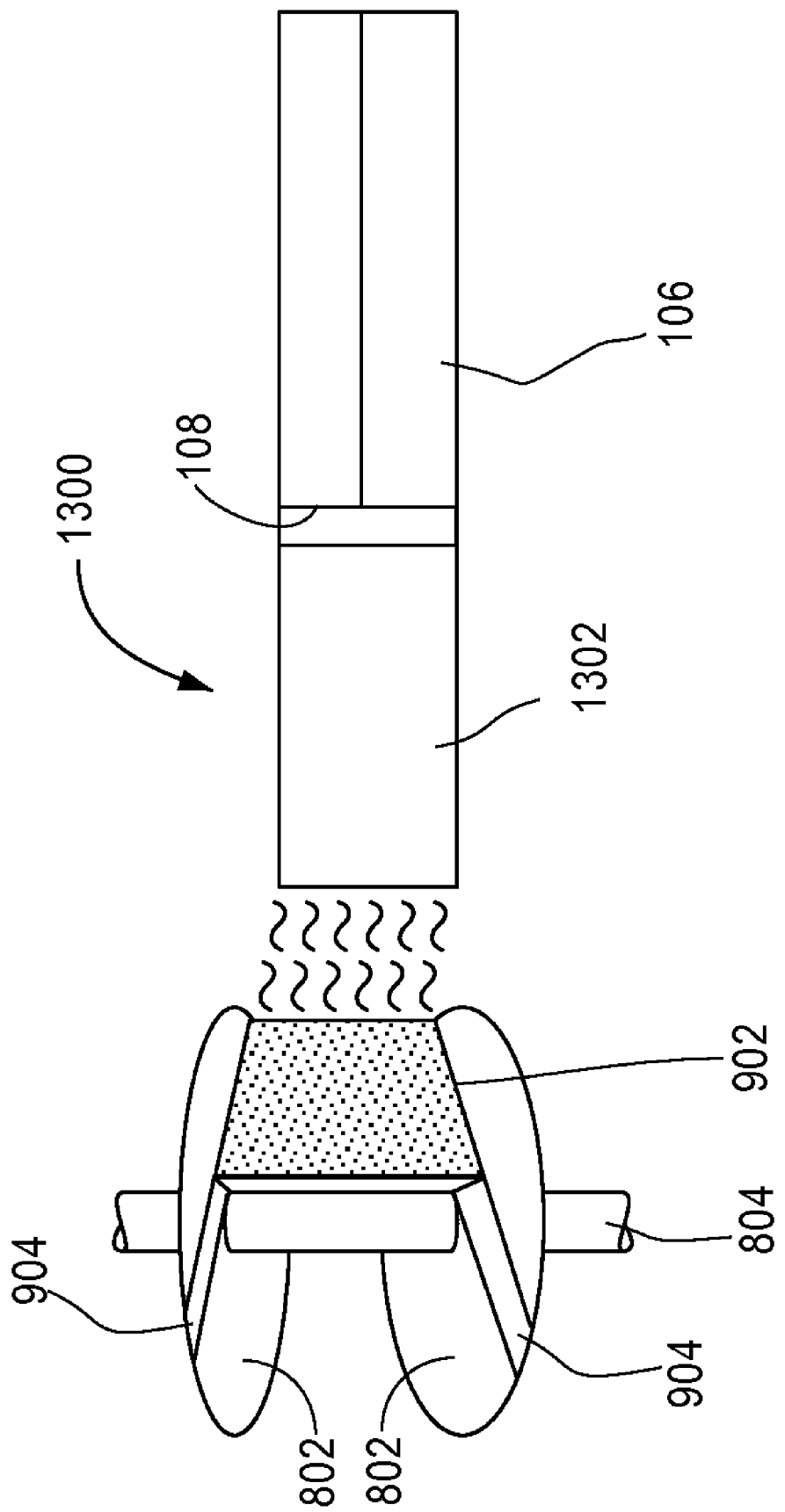

(12) United States Patent
US 7,948,108 B2

SYSTEMS AND METHODS FOR CONVERTING MARINE CURRENTS INTO ELECTRICAL ENERGY

CROSS-REFERENCE TO RELATED APPLICATIONS/INCORPORATION BY REFERENCE

This application claims priority to U.S. Provisional Application No. 61/206,843 filed Feb. 6, 2009, entitled "PARALLELEPIPED," which application is incorporated by reference herein in its entirety.

FIELD OF THE INVENTION

The present invention relates to systems and methods for converting marine currents into electrical energy.

BACKGROUND OF THE INVENTION

Converting marine currents into electrical energy is an endeavor that has been pursued for some time. However, the full potential for harnessing marine currents is yet to be realized. Providing improved systems and methods for converting marine currents into electrical energy is desirable, particularly given the present global initiatives for establishing and improving environmentally friendly and non-depleting energy sources.

SUMMARY OF THE INVENTION

Embodiments of the present technology provide systems and methods for converting marine currents into electrical energy.

Certain embodiments provide a system for converting marine current into electrical energy comprising: a housing comprising an opening that is adjustable between an open position that allows fluid to enter the housing through the opening and a closed position that does not allow fluid to enter the housing through the opening; and a plunger that is configurable between a porous state that allows fluid to pass through the plunger and a non-porous state that does not allow fluid to pass through the plunger, the plunger disposed in the housing, the plunger configured to translate about the housing in a first direction when the opening is in the open position and the plunger is in the non-porous state, the plunger configured to translate about the housing in a second direction opposite the first direction when the opening is in the closed position and the plunger is in the porous state, wherein translation of the plunger in the first direction is used to create electrical energy.

In certain embodiments, the system can further include an inlet configured to direct fluid toward the opening, the inlet configured to decrease the volume through which water flows.

In certain embodiments, the plunger comprises a plurality fins, the plunger being configurable between the porous state and the non-porous state by manipulating the plurality fins.

In certain embodiments, the opening can be blocked using at least one of a translating wall and a plurality of fins.

In certain embodiments, translation of the plunger actuates a hydraulic cylinder, thereby causing a motor to run and allowing a generator to create electrical energy.

In certain embodiments, translation of the plunger actuates a rod and ratchet system, thereby allowing a generator to create electrical energy.

In certain embodiments, the system can further include a second housing comprising a second opening that is adjustable between an open position that allows fluid to enter the second housing through the second opening and a closed position that does not allow fluid to enter the second housing through the second opening; a second plunger that is configurable between a porous state that allows fluid to pass through the second plunger and a non-porous state that does not allow fluid to pass through the second plunger, the second plunger disposed in the second housing, the second plunger configured to translate about the second housing in the first direction when the second opening is in the open position and the second plunger is in the non-porous state, the second plunger configured to translate about the second housing in the second direction opposite the first direction when the second opening is in the closed position and the second plunger is in the porous state, and wherein the plunger and the second plunger are connected using a pulley system such that when the plunger translates in the first direction, the second plunger translates in the second direction opposite the first direction.

In certain embodiments, the housing has a larger cross-section than the second housing.

In certain embodiments, translation of the second plunger in the first direction is used to create electrical energy.

In certain embodiments, the system can further include an axis configured to rotate in a first rotational direction; a first deck extending radially from the axis and comprising a slot configured to receive a vane; a second deck extending radially from the axis and comprising a second slot configured to receive the vane; and the vane disposed between the decks in the slots, the vane configured to translate between a first end of the decks and a second end of the decks when the axis rotates one hundred and eighty degrees in the first rotational direction, wherein rotation of the axis in the first rotational direction is used to create electrical energy.

In certain embodiments, the axis is disposed generally horizontally, and gravity is used at least in part to translate the vane between the first end of the decks and the second end of the decks.

Certain embodiments provide a method for converting marine current into electrical energy comprising: converting a plunger disposed in a housing from a porous state that allows fluid to pass through the plunger to a non-porous state that does not allow fluid to pass through the plunger; unblocking an opening at an end of the housing, thereby allowing fluid to enter the housing through the opening and displace the plunger in a first direction; blocking the opening; converting the plunger from the non-porous state to the porous state; displacing the plunger in a second direction opposite the first direction; and using the displacement of the plunger in the first direction to create electrical energy.

In certain embodiments, the method can further include using an inlet configured to direct fluid toward the opening to decrease the volume through which water flows prior to arriving at the opening.

In certain embodiments, the plunger comprises a plurality fins, and the plunger is configurable between the porous state and the non-porous state by manipulating the plurality fins.

In certain embodiments, the opening is blocked using at least one of a translating wall and a plurality of fins.

In certain embodiments, translation of the plunger actuates a hydraulic cylinder, thereby causing a motor to run and allowing a generator to create electrical energy.

In certain embodiments, translation of the plunger actuates a rod and ratchet system, thereby allowing a generator to create electrical energy.

In certain embodiments, the method can further include converting a second plunger disposed in a second housing from a porous state that allows fluid to pass through the second plunger to a non-porous state that does not allow fluid to pass through the second plunger; unblocking a second opening at an end of the second housing, thereby allowing fluid to enter the second housing through the second opening and displace the second plunger in the first direction; blocking the second opening; converting the second plunger from the non-porous state to the porous state; and displacing the second plunger in a second direction opposite the first direction, wherein the plunger and the second plunger are connected using a pulley system such that when the plunger translates in the first direction, the second plunger translates in the second direction opposite the first direction.

In certain embodiments, the housing has a larger cross-section than the second housing.

In certain embodiments, the method can further include using the displacement of the second plunger in the first direction to create electrical energy.

BRIEF DESCRIPTION OF THE DRAWING(S)

FIG. 4 depicts a system for converting marine currents into electrical energy used in accordance with an embodiment of the present technology.

FIG. 6 depicts a system for converting marine currents into electrical energy used in accordance with an embodiment of the present technology.

FIG. 7 depicts a system for converting marine currents into electrical energy used in accordance with an embodiment of the present technology.

FIG. 8 depicts a system for converting marine currents into electrical energy used in accordance with an embodiment of the present technology.

FIG. 9A depicts a system for converting marine currents into electrical energy used in accordance with an embodiment of the present technology.

FIG. 9B depicts a portion of the system depicted in FIG. 9A.

FIG. 9C depicts a portion of a system for converting marine currents into electrical energy used in accordance with an embodiment of the present technology.

FIG. 10 depicts three views of a turbine with moving vanes used in accordance with an embodiment of the present technology.

FIG. 11 depicts six views of a portion of a turbine with a moving vane used in accordance with an embodiment of the present technology.

FIG. 12 depicts views of a portion of a turbine with a moving vane used in accordance with an embodiment of the present technology.

FIG. 13 depicts a system for converting marine currents into electrical energy used in accordance with an embodiment of the present technology.

Figure 1:
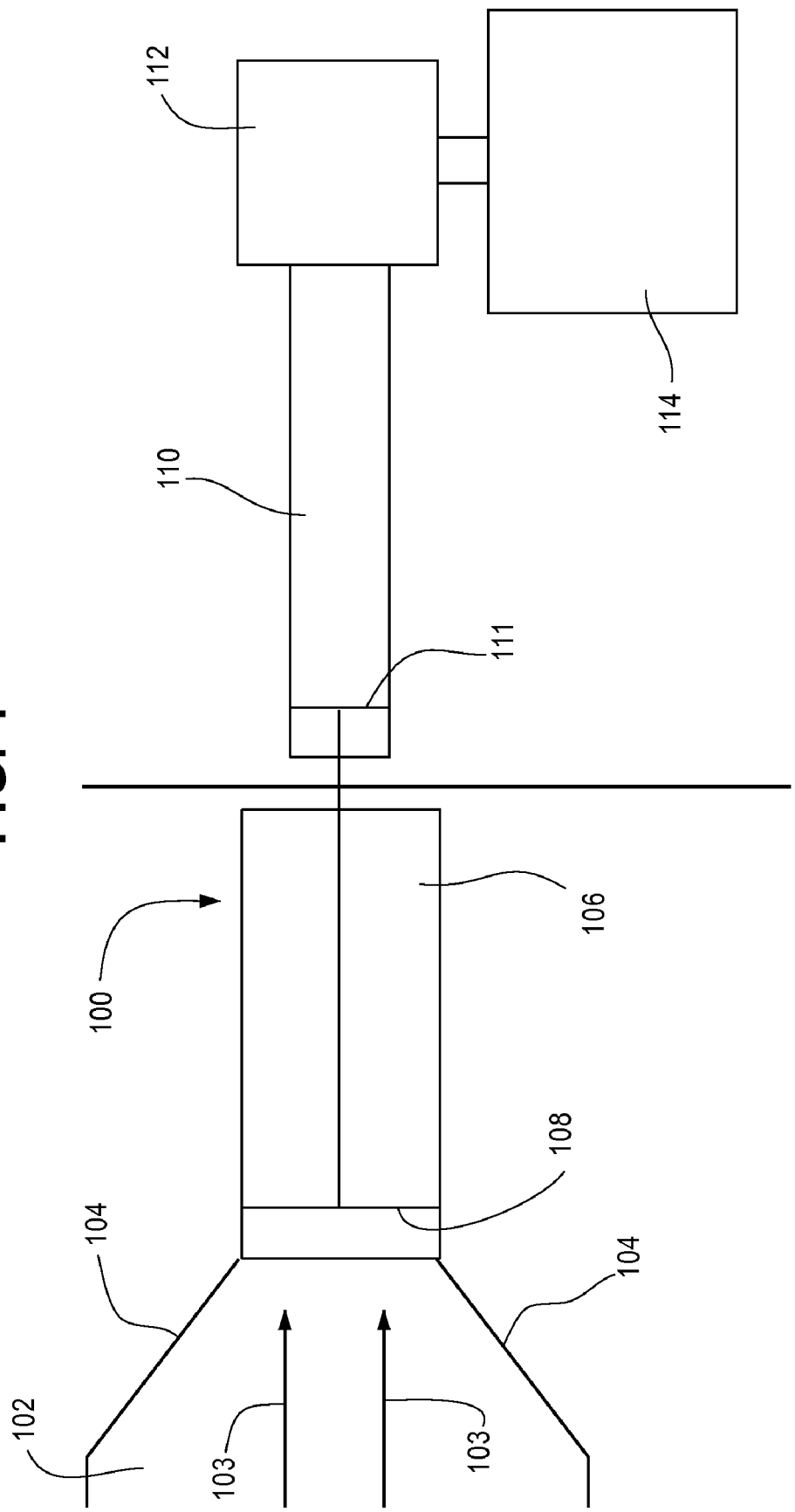
FIG. 1 depicts a system for converting marine currents into electrical energy used in accordance with an embodiment of the present technology.

The foregoing summary, as well as the following detailed description of embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF PREFERRED EMBODIMENT(S)

Below is a detailed description of embodiments depicted in FIGS. 1-13. In the figures, like elements are identified with like indicators.

FIG. 1 depicts a system 100 for converting marine currents into electrical energy used in accordance with an embodiment of the present technology. The system 100 includes an inlet 102 configured to receive water in the direction of arrows 103. Inlet 102 includes walls 104 that are configured to decrease the volume through which water flows as it enters the system 100. Such a decrease in volume can increase the velocity or pressure of water as it passes through inlet 102. In certain embodiments, the walls can form a conical inlet, for example. Inlet 102 is in fluid communication with housing 106. Disposed in housing 106 is plunger 108. Plunger 108 is mechanically connected to hydraulic cylinder 110 that includes plunger 111. Hydraulic cylinder 110 is mechanically connected to motor 112. Motor 112 is in mechanical and/or electrical communication with generator 114.

In operation, water can flow into inlet 102 in the direction of arrows 103, thereby forcing plunger 108 to translate in the direction of arrows 103. Translation of plunger 108 can cause plunger 111 to translate in the direction of arrows 103, thereby stroking the hydraulic cylinder 110, causing motor 112 to run, and allowing generator 114 to create electrical energy that can be provided to a system and/or storage cell, such as a battery, for example. Plunger 108 can be returned to its initial position using mechanical methods, such as a motor system, for example, and/or by using other mechanical methods, as discussed herein, for example.

In certain embodiments, plunger 108 can be disposed on rollers or skis, for example, that are configured to reduce friction between plunger 108 and housing 106. Reducing friction between plunger 108 and housing 106 can improve efficiency of the system 100.

In certain embodiments, inlet 102 and housing 106 can be disposed offshore and underwater, such as on the ocean floor, for example, and the hydraulic cylinder 110, motor 112 and generator 114 can be disposed on shore, such as underground, for example.

Figure 2:
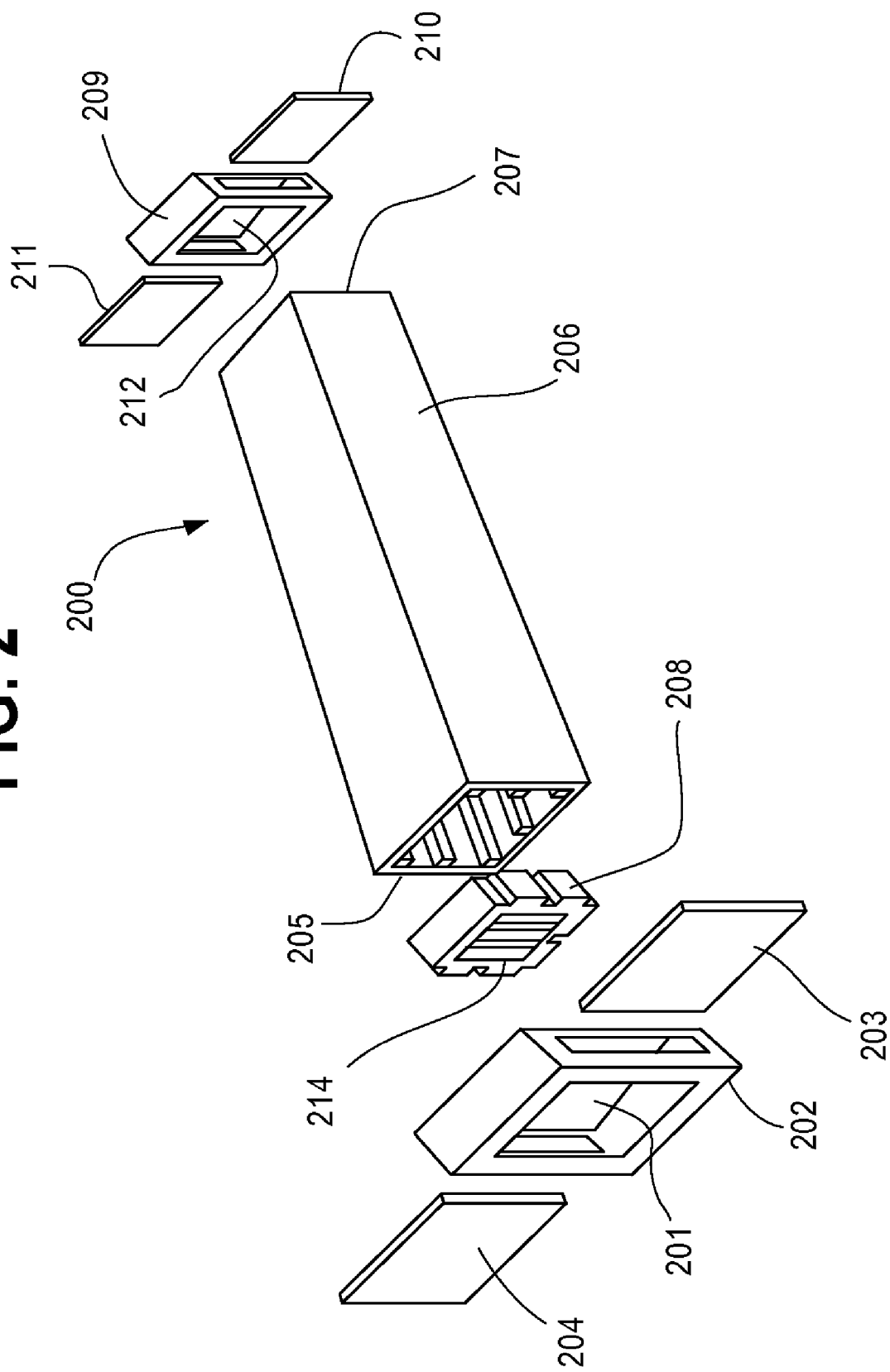
FIG. 2 depicts a component of a system for converting marine currents into electrical energy used in accordance with an embodiment of the present technology.

FIG. 2 depicts a component 200 of a system for converting marine currents into electrical energy used in accordance with an embodiment of the present technology. The component 200 includes a housing 206 with a first open end 205 and a second open end 207 (opposite the first open end 205). Plunger 208 is configured to be disposed within the housing 206. Plunger 208 includes a plurality of fins 214 that can be manipulated between open positions and a closed position. When fines 214 are in the open positions, plunger 208 is porous such that fluid can flow through plunger 208. When fins 214 are in the closed position, plunger 208 is substantially non-porous such that fluid cannot flow through plunger 208. The component 200 also includes a first end cap 202 configured to be attachable to the first open end 205. The first end cap 202 has an opening 201 therethrough. Opening 201 can be obstructed partially or completely by translating wall 203 and/or 204 into position in the opening 201. The component 200 also includes a second end cap 209 configured to be attachable to the second open end 207. The second end cap 209 has an opening 212 therethrough. Opening 212 can be obstructed partially or completely by translating wall 210 and/or 211 into position in the opening 201. For example, it may be desirable to close opening 212 in order to service the interior of the housing 206. In certain embodiments, the openings 201, 212 can be opened and closed using a plurality of fins similar to those described in connection with plunger 208.

In certain embodiments, the component 200 can be used in connection with the system 100 described in connection with FIG. 1. In such embodiments, housing 206 would be configured as housing 106. In such embodiments, when returning plunger 208 to its initial position, opening 201 can be blocked by wall 203 and/or 204, such that water cannot enter housing 206 through opening 201. Plunger 208 can be adjusted into a porous state to reduce interference from water that may remain in housing 206. Plunger 208 can then be translated in the direction opposite arrows 103 to its initial state. Plunger 208 can then be adjusted to a substantially non-porous state and opening 201 can be unblocked, by translating walls 203 and/or 204 out of opening 201.

Figure 3:
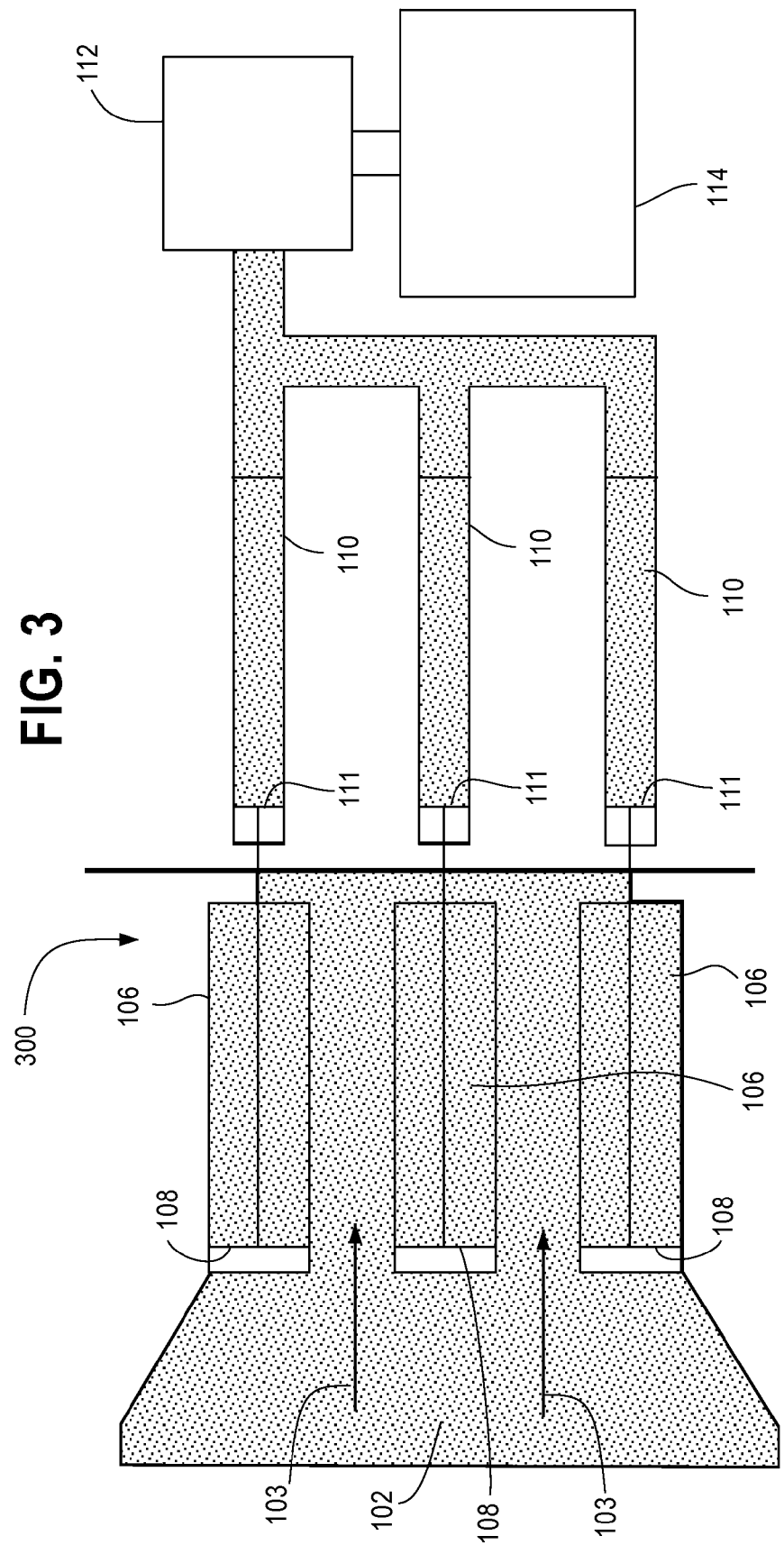
FIG. 3 depicts a system for converting marine currents into electrical energy used in accordance with an embodiment of the present technology.

FIG. 3 depicts a system 300 for converting marine currents into electrical energy used in accordance with an embodiment of the present technology. In system 300, inlet 102 is large enough to accommodate three housings 106. Each housing 106 is attached to a respective hydraulic cylinder 110. All three hydraulic cylinders 110 are attached to a motor 112 and generator 114. In the embodiment shown, the three housings 106 are disposed in spaced apart parallel relationship to each other. In other embodiments, the housings 106 can be configured in a different spatial relationship. In the embodiment shown, there are three housing 106 and cylinder 110 pairs. In other embodiments, there can be a different number of housing 106 and cylinder 110 pairs, such as two, or four, or ten, for example.

Figure 5A:
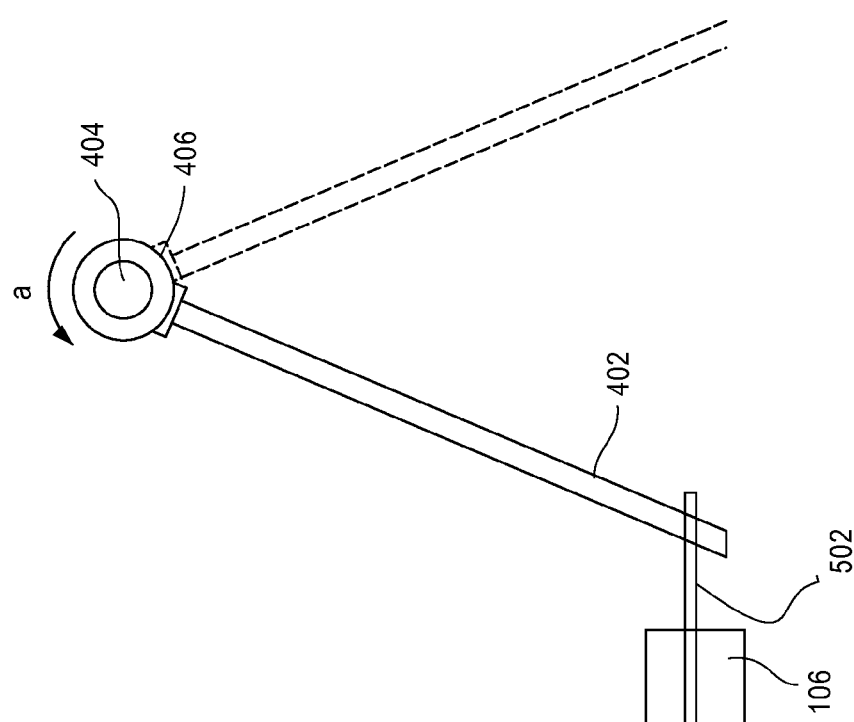
FIG. 5A depicts a component of the system depicted in FIG. 4.
Figure 5B:
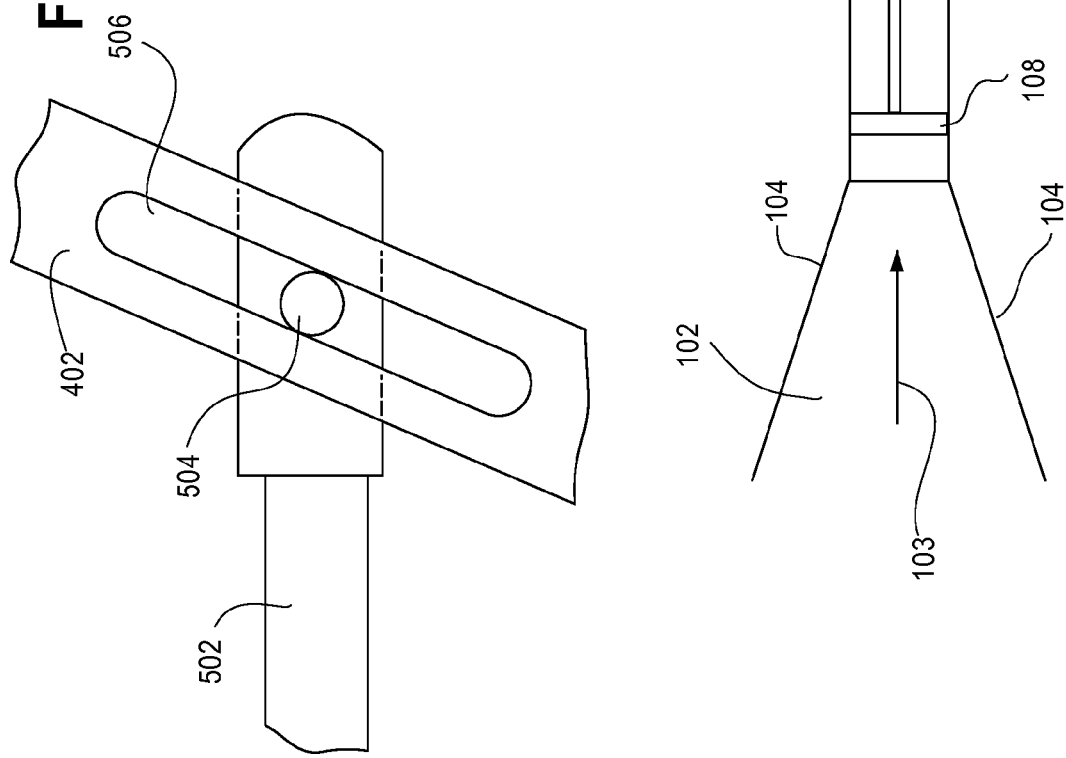
FIG. 5B depicts a component of the system depicted in FIG. 4

FIG. 4 depicts a system 400 for converting marine currents into electrical energy used in accordance with an embodiment of the present technology. The system 400 includes housings 106 with plungers 108 that are mechanically connected to rods 402 (for example as depicted in FIGS. 5A and 5B) that are mechanically connected to ratchets 406 disposed about an axis 404. Ratchets 406 are in mechanical and/or electrical communication with generator 114. In operation, water can force each respective plunger 108 to translate, thereby causing the connected rod 402 and ratchet 406 to rotate about axis 404. Rotation of ratchet 406 can allow generator 114 to create electrical energy that can be provided to a system and/or storage cell, such as a battery, for example. Plungers 108 can be returned to their initial positions using mechanical methods, as discussed, for example, herein.

In certain embodiments, housings 106, rods 402 and ratchets 406 can be disposed offshore and underwater, and the generator 114 can be disposed on shore. In the embodiment shown, there are four housing 106 and rod 402/ratchet 406 pairs. In other embodiments, there can be a different number of housing 106 and rod 402/ratchet 406 pairs, such as three, five, or ten, for example.

FIG. 5A depicts one of the housing 106 and rod 402/ratchet 406 pairs of the system 400. In the depicted embodiment, plunger 108 is mechanically attached to the rod 402 using member 502. When plunger 108 translates in direction 103, member 502 also translates in direction 103, causing rod 402 and ratchet 406 to rotate about axis 404 in the direction a.

FIG. 5B depicts one form of attachment between member 502 and rod 402. Rod 402 includes an elongated opening 506 that runs a portion of the length of rod 402. Member 502 includes a knob 504 configured to be received and retained in the elongated opening 506. Knob 504 can translate about the elongated opening 506 when member 502 translates.

FIG. 6 depicts a system 600 for converting marine currents into electrical energy used in accordance with an embodiment of the present technology. The system 600 includes a first component 601 connected to a second component 603 by a pulley system 602. Each component 601, 603 includes a housing 106 with a plunger 108. In operation, water can flow into housing 106 of first component 601, thereby forcing plunger 108 of first component 601 to translate in the direction m and forcing plunger 108 of second component 603 to translate in the opposite direction n. When the plunger's 108 are fully displaced (as shown in FIG. 6), the first component 601 can block its opening through which water is received and cause its plunger 108 to become porous. The second component 603 can then unblock its opening through which water is received and cause its plunger 108 to become substantially non-porous. Water can flow into housing 106 of second component 603, thereby forcing the plunger 108 of first component 601 to translate in the direction m and forcing the plunger 108 of second component 603 to translate in the opposite direction n. Such a configuration can allow the associated hydraulic cylinders to be stroked without requiring other mechanical methods of returning the plungers to their initial positions. As discussed above, stroking the hydraulic cylinder 110 can cause motor (not shown) to run, and allow generator (not shown) to create electrical energy that can be provided to a system and/or storage cell, such as a battery, for example.

In certain embodiments, the components 601, 603 and the pulley system 602 can be disposed offshore and underwater, and the cylinders 110, motor and generator can be disposed on shore.

FIG. 7 depicts a system 700 for converting marine currents into electrical energy used in accordance with an embodiment of the present technology. The system 700 functions like the system 600 depicted in FIG. 6. However, rather than having two similar sized components 601, 603 attached by a pulley system 602, a larger component 701 and a smaller component 703 are attached using a pulley system 602 that can be used to return the larger component 701 to the initial position. Also, only the larger components 701 are attached to the cylinders 110.

FIG. 8 depicts a system 800 for converting marine currents into electrical energy used in accordance with an embodiment of the present technology. The system 800 includes a plurality of decks 802 attached to axis 804, which is in mechanical and/or electrical communication with generator 114. When decks 802 rotate in the direction r, axis 804 rotates in the direction r, thereby allowing generator 114 to create electrical energy that can be provided to a system and/or storage cell, such as a battery, for example. In certain embodiments, the decks 802 can be disposed offshore and underwater, and the generator 114 can be disposed on shore. The system 800 is depicted as having a vertical axis 804. Nonetheless, the axis 804 can be disposed horizontally or in another orientation.

FIG. 9A depicts a system 900 for converting marine currents into electrical energy used in accordance with an embodiment of the present technology. The system 900 functions similar to the system 800 depicted in FIG. 8. The system 900 comprises a turbine that includes vanes 902 that can force the decks 802 to rotate when water passes by. The vanes 902 can be fixed or variable. For example, in the embodiment depicted in FIG. 9A, the vanes 902 can vary position by translating about slots 904 in the decks 802. FIGS. 19B and 9C depict slots 904 in decks 802 and rollers 1302 that can be disposed in the slots 904 in order to reduce friction. Variable vane configurations described herein can maintain rotation of an axis in one direction without the vanes unduly opposing rotation in that direction. In certain embodiments, mechanical methods can be used to force the vanes 902 to translate about the slots 904. In certain embodiments, such as when a horizontal axis 804 is used, gravity can force the vanes 902 to translate about the slots 904.

FIG. 10 depicts three views 1000, 1001, 1003 of a turbine with variable vanes 1002, 1004, 1006, 1008 used in accordance with an embodiment of the present technology. The turbine is disposed horizontally such that axis 804 is horizontal. Vanes 1002 and 1008 are disposed in similarly oriented slots that are generally ninety degrees out of phase with the slots that vanes 1004 and 1006 are disposed in. The vanes 1002, 1004, 1006, 1008 are configured to translate about slots such that the broad sides of the vanes 1002, 1004, 1006, 1008 do not block the entire area above the axis 804 and between the decks 802. In certain embodiments, more vanes (or sets of vanes) can be added that are out of phase with vanes 1002, 1004, 1006 and/or 1008.

In the first position 1000, vanes 1002 and 1008 are disposed below axis 804 and spanning between opposing decks 802 such that the entire area below the axis 804 and between the decks 802 is blocked by the broad side of the vanes 1002, 1008. In the first position 1000, vanes 1004 and 1006 are disposed below axis 804 and spanning between opposing decks 802 such that only a small portion of the area below the axis 804 and between the decks 802 is blocked by the narrow end of the vanes 1004, 1006.

The second position 1001 depicts a ninety degree turn from the first position 1000. During the ninety degree turn, vanes 1004 and 1006 can translate in their respective slots such that, in the second position 1001, vanes 1004 and 1006 are disposed below axis 804 and spanning between opposing decks 802 such that the entire area below the axis 804 and between the decks 802 is blocked by the broad side of the vanes 1004, 1006. In the second position 1001, vanes 1002 and 1008 are disposed below axis 804 and spanning between opposing decks 802 such that only a small portion of the area below the axis 804 and between the decks 802 is blocked by the narrow end of the vanes 1002, 1008.

The third position 1003 depicts a ninety degree turn from the second position 1001 (and a one-hundred and eighty degree turn from the first position). During the ninety degree turn, vanes 1002 and 1008 can translate in their respective slots such that, in the third position 1003, vanes 1002 and 1008 are disposed below axis 804 and spanning between opposing decks 802 such that the entire area below the axis 804 and between the decks 802 is blocked by the broad sides of the vanes 1002, 1008. In the third position 1003, vanes 1004 and 1006 are disposed above axis 804 and spanning between opposing decks 802 such that only a small portion of the area above the axis 804 and between the decks 802 is blocked by the narrow end of the vanes 1004, 1006.

The configuration shown in FIG. 10 can utilize variable vanes in order to maintain rotation in one direction without any of the vanes unduly opposing rotation in that direction.

FIG. 11 depicts six views 1101, 1102, 1103, 1104, 1105, 1106 of a portion of a turbine with a variable vane 1100 used in accordance with an embodiment of the present technology. The views 1101, 1102, 1103, 1104, 1105, 1106 depict motion of the turbine in the direction z and translation of the vane 1100 about the slot 904. In the first view 1101, vane 1100 is disposed below axis 804 and spanning between opposing decks 802 such that the entire area below the axis 804 and between the decks 802 is blocked by the broad side of the vane 1100. In the second view 1102, the turbine has rotated in the direction z ninety degrees. Vane 1100 is disposed above axis 804 and spanning between opposing decks 802 such that only a small portion of the area above the axis 804 and between the decks 802 is blocked by the narrow end of the vane 1100. In the third view 1103, the turbine has rotated in the direction z about forty five degrees. Vane 1100 is disposed above axis 804 and spanning between opposing decks 802 such that a portion of the area above the axis 804 and between the decks 802 is blocked by the broad end of the vane 1100. In the fourth view 1104, the turbine has not rotated much further, but vane 1100 has translated in slot 904 somewhat. In the fifth view 1105, the turbine has not rotated much further, but vane 1100 has translated further in slot 904. In the sixth view 1106, the turbine has rotated in the direction z about forty five degrees (one hundred and eighty degrees from the first view 1101). Vane 1100 is disposed below axis 804 and spanning between opposing decks 802 such that the entire area below the axis 804 and between the decks 802 is blocked by the broad side of the vane 1100.

The configuration shown in FIG. 11 can utilize a variable vane in order to maintain rotation in the direction z without the vane unduly opposing rotation in that direction. In certain embodiments, mechanical methods can be used to force the vane 1100 to translate about the slot 904. In certain embodiments, such as when a horizontal axis 804 is used, gravity can force the vane 1100 to translate about the slot 904.

Figure 12:
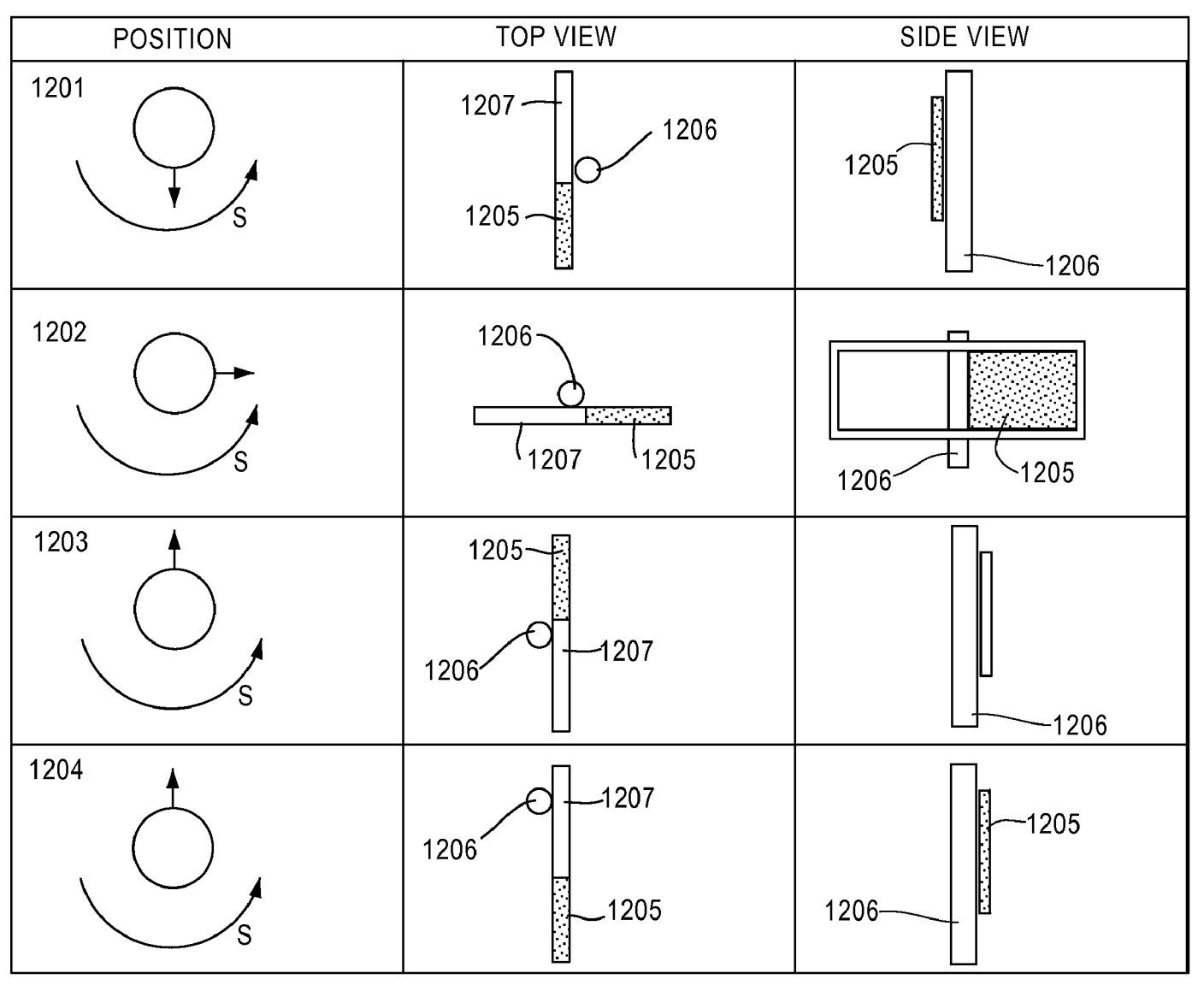

FIG. 12 is a table depicting four views 1201, 1202, 1203, 1204 of a portion of a turbine with a variable vane 1205 used in accordance with an embodiment of the present technology. The top view and side view are also depicted for each position. The views 1201, 1202, 1203, 1204 depict motion of the turbine in the direction s about axis 1206 and translation of the vane 1205 about slot 1207. FIG. 12 is described in terms of axis 1206 being a vertical axis, however, the same general configuration can apply with a horizontal axis or an otherwise oriented axis. In the first position 1201, vane 1205 is disposed toward a first side slot 1207. In the second position 1202, the turbine has rotated ninety degrees about axis 1206, and vane 1205 remains disposed toward the first side of slot 1207. In the third position 1203, the turbine has rotated another ninety degrees about axis 1206 (one hundred and eighty degrees from the first position 1201), and vane 1205 remains disposed toward the first side of slot 1207. In the fourth position 1204, the turbine has not rotated any further, and vane 1205 has translated about slot 1207 to the side opposite the first side.

The configuration shown in FIG. 12 can utilize a variable vane in order to maintain rotation in the direction s without the vane unduly opposing rotation in that direction. In certain embodiments, mechanical methods can be used to force the vane 1205 to translate about the slot 1207. In certain embodiments, such as when a horizontal axis 1206 is used, gravity can force the vane 1205 to translate about the slot 1207.

FIG. 13 depicts a system 1300 for converting marine currents into electrical energy used in accordance with an embodiment of the present technology. The system 1300 includes a turbine with a variable vane 902 configured to feed fluid into an inlet 1302 configured to direct fluid to a housing 106 with a plunger 108 disposed therein. In certain embodiments, any of the turbines described in connection with FIGS. 8-12 can be combined with any of the systems described in connection with FIGS. 1-7 in order to improve fluid flow and/or to provide electrical energy to a system and/or storage cell.

Certain embodiments of the present technology comprise methods of constructing and/or employing the systems described herein.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A system for converting marine current into electrical energy comprising:
    a housing comprising an opening that is adjustable between an open position that allows fluid to enter the housing through the opening and a closed position that does not allow fluid to enter the housing through the opening; and
    a plunger that is configurable between a porous state that allows fluid to pass through the plunger and a non-porous state that does not allow fluid to pass through the plunger, the plunger disposed in the housing, the plunger configured to translate about the housing in a first direction when the opening is in the open position and the plunger is in the non-porous state, the plunger configured to translate about the housing in a second direction opposite the first direction when the opening is in the closed position and the plunger is in the porous state,
    wherein translation of the plunger in the first direction is used to create electrical energy.

2. The system of claim 1, further comprising an inlet configured to direct fluid toward the opening, the inlet configured to decrease the volume through which water flows.

3. The system of claim 1, wherein the plunger comprises a plurality fins, the plunger being configurable between the porous state and the non-porous state by manipulating the plurality fins.

4. The system of claim 1, wherein the opening can be blocked using at least one of a translating wall and a plurality of fins.

5. The system of claim 1, wherein translation of the plunger actuates a hydraulic cylinder, thereby causing a motor to run and allowing a generator to create electrical energy.

6. The system of claim 1, wherein translation of the plunger actuates a rod and ratchet system, thereby allowing a generator to create electrical energy.

7. The system of claim 1, further comprising:
    a second housing comprising a second opening that is adjustable between an open position that allows fluid to enter the second housing through the second opening and a closed position that does not allow fluid to enter the second housing through the second opening;
    a second plunger that is configurable between a porous state that allows fluid to pass through the second plunger and a non-porous state that does not allow fluid to pass through the second plunger, the second plunger disposed in the second housing, the second plunger configured to translate about the second housing in the first direction when the second opening is in the open position and the second plunger is in the non-porous state, the second plunger configured to translate about the second housing in the second direction opposite the first direction when the second opening is in the closed position and the second plunger is in the porous state, and
    wherein the plunger and the second plunger are connected using a pulley system such that when the plunger translates in the first direction, the second plunger translates in the second direction opposite the first direction.

8. The system of claim 7, wherein the housing has a larger cross-section than the second housing.

9. The system of claim 7, wherein translation of the second plunger in the first direction is used to create electrical energy.

10. The system of claim 1, further comprising:
    an axis configured to rotate in a first rotational direction;
    a first deck extending radially from the axis and comprising a slot configured to receive a vane;
    a second deck extending radially from the axis and comprising a second slot configured to receive the vane; and
    the vane disposed between the decks in the slots, the vane configured to translate between a first end of the decks and a second end of the decks when the axis rotates one hundred and eighty degrees in the first rotational direction,
    wherein rotation of the axis in the first rotational direction is used to create electrical energy.

11. The system of claim 10, wherein the axis is disposed generally horizontally, and gravity is used at least in part to translate the vane between the first end of the decks and the second end of the decks.

12. A method for converting marine current into electrical energy comprising:
    converting a plunger disposed in a housing from a porous state that allows fluid to pass through the plunger to a non-porous state that does not allow fluid to pass through the plunger;
    unblocking an opening at an end of the housing, thereby allowing fluid to enter the housing through the opening and displace the plunger in a first direction;
    blocking the opening;
    converting the plunger from the non-porous state to the porous state;
    displacing the plunger in a second direction opposite the first direction; and
    using the displacement of the plunger in the first direction to create electrical energy.

13. The method of claim 12, further comprising using an inlet configured to direct fluid toward the opening to decrease the volume through which water flows prior to arriving at the opening.

14. The method of claim 12, wherein the plunger comprises a plurality fins, and the plunger is configurable between the porous state and the non-porous state by manipulating the plurality fins.

15. The method of claim 12, wherein the opening is blocked using at least one of a translating wall and a plurality of fins.

16. The method of claim 12, wherein translation of the plunger actuates a hydraulic cylinder, thereby causing a motor to run and allowing a generator to create electrical energy.

17. The method of claim 12, wherein translation of the plunger actuates a rod and ratchet system, thereby allowing a generator to create electrical energy.

18. The method of claim 12, further comprising:
    converting a second plunger disposed in a second housing from a porous state that allows fluid to pass through the second plunger to a non-porous state that does not allow fluid to pass through the second plunger;
    unblocking a second opening at an end of the second housing, thereby allowing fluid to enter the second housing through the second opening and displace the second plunger in the first direction;

blocking the second opening;

converting the second plunger from the non-porous state to the porous state; and displacing the second plunger in a second direction opposite the first direction, wherein the plunger and the second plunger are connected using a pulley system such that when the plunger translates in the first direction, the second plunger translates in the second direction opposite the first direction.

19. The method of claim 18, wherein the housing has a larger cross-section than the second housing.

20. The method of claim 18, further comprising using the displacement of the second plunger in the first direction to create electrical energy.

* * * * *